United States Patent
Kolling

(10) Patent No.: US 11,997,245 B2
(45) Date of Patent: May 28, 2024

(54) METHOD FOR A CORRESPONDING COLOR DISPLAY ON THE BASIS OF SPECTRAL COLOR IMPRESSIONS FOR DIFFERENT OUTPUT APPLICATIONS

(71) Applicant: Colordigital GmbH, Cologne (DE)

(72) Inventor: Olaf Kolling, Cologne (DE)

(73) Assignee: COLORDIGITAL GMBH, Cologne (DE)

( * ) Notice: Subject to any disclaimer, the term of this patent is extended or adjusted under 35 U.S.C. 154(b) by 0 days.

(21) Appl. No.: 17/258,611

(22) PCT Filed: Jul. 8, 2019

(86) PCT No.: PCT/DE2019/100640
§ 371 (c)(1),
(2) Date: Jan. 7, 2021

(87) PCT Pub. No.: WO2020/011310
PCT Pub. Date: Jan. 16, 2020

(65) Prior Publication Data
US 2021/0281716 A1    Sep. 9, 2021

(30) Foreign Application Priority Data

Jul. 10, 2018    (DE) ..................... 10 2018 116 717.2

(51) Int. Cl.
*H04N 1/60*        (2006.01)
(52) U.S. Cl.
CPC ............................. *H04N 1/6052* (2013.01)

(58) Field of Classification Search
None
See application file for complete search history.

(56) References Cited

U.S. PATENT DOCUMENTS

| | | | |
|---|---|---|---|
| 2003/0020727 A1* | 1/2003 | Newman | H04N 1/6052 345/604 |
| 2011/0026821 A1* | 2/2011 | Edge | G01J 3/463 382/167 |
| 2016/0112604 A1* | 4/2016 | Bestmann | H04N 1/603 358/504 |

\* cited by examiner

*Primary Examiner* — Miya J Cato
(74) *Attorney, Agent, or Firm* — Dinsmore & Shohl LLP

(57) ABSTRACT

A method for identical color display based on spectral data impressions for different output applications related to the digital data processing of color information values for different output applications and different color values according to usual standard regarding a controlled, loss-less and color-correct display of specific pre-defined color impressions with location-independent matching and adjusting of the color data. The method contains instructions for identifying and providing in an IT infrastructure specific color data as spectral data records that are converted and transmitted for an output application in real time into a device-specific color profile for a specific output device, taking into account query-dependent values. In a preferred application, material- and substance-specific data is taken into account during conversion. In another preferred application the spectral data records are provided for subsequent queries.

5 Claims, 1 Drawing Sheet

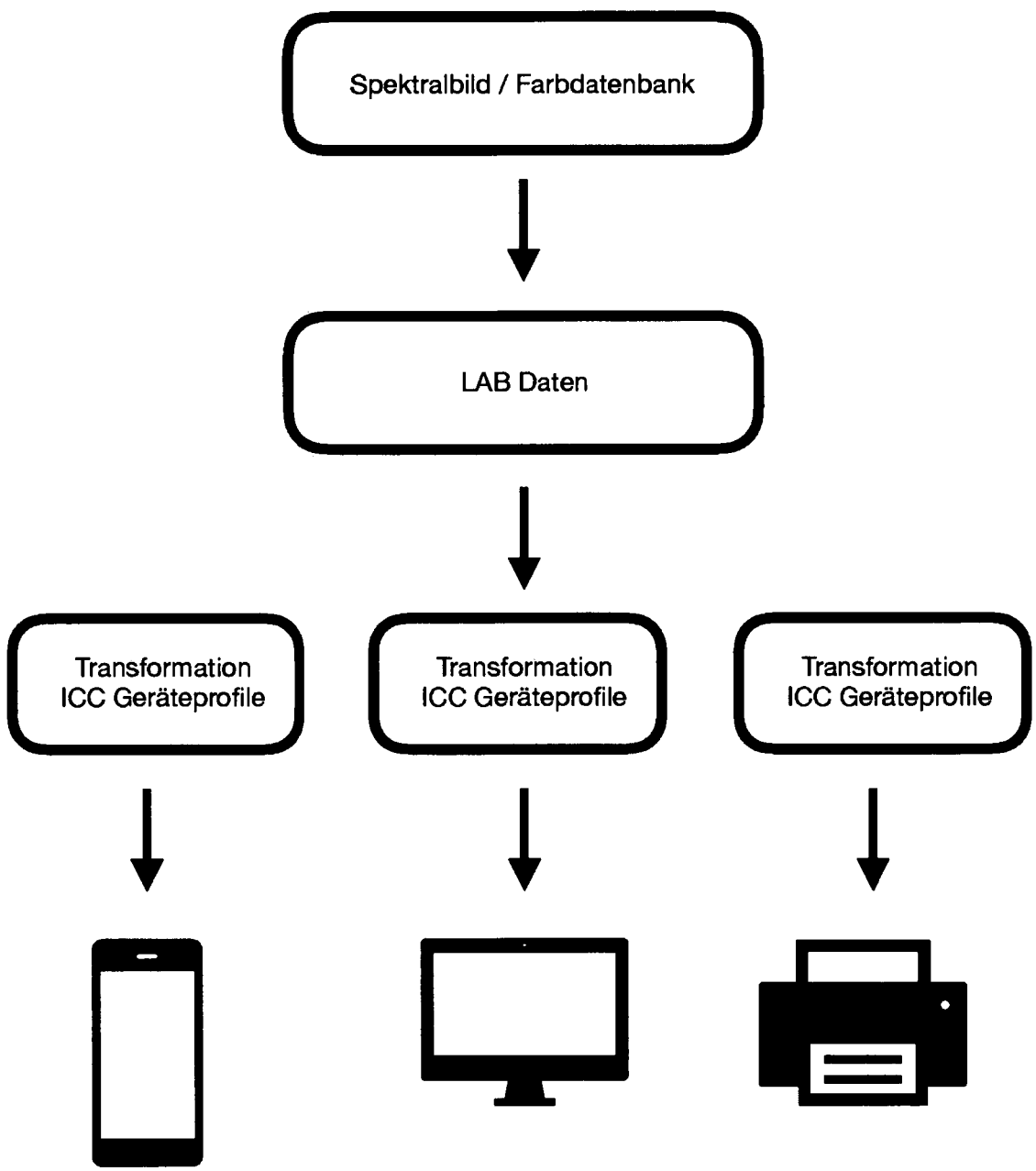

METHOD FOR A CORRESPONDING COLOR DISPLAY ON THE BASIS OF SPECTRAL COLOR IMPRESSIONS FOR DIFFERENT OUTPUT APPLICATIONS

CROSS-REFERENCE TO RELATED APPLICATIONS

The subject application is a U.S. National Stage application of International Application No. PCT/DE2019/100640, filed on 8 Jul. 2019, which claims the priority of German Patent Application No. 10 2018 116 717.2, filed on 10 Jul. 2018. The contents of both applications are herein incorporated by reference in their entirety.

A method for matching color display based on spectral color impressions for different output applications.

The present invention relates to the field of processing color information values for most diverse output applications in which color values are used according to usual data processing standards, and it relates to a controlled, lossless, and color-correct display of specific preset color impressions for any output applications, in particular for screens and other optical display devices, as well as for reproduction in technical printing and dying processes, by means of location-independent matching and adjusting of the color data to the intended color display.

Color management is usually used in order to adjust the capturable color gamut of an input device to the gamut of the colors displayable by the display system. For this purpose, various methods are known according to prior art, which are also generally subsumed under the term color management.

In patent document EP1370071B1, such a method for optimizing image data by means of color management is disclosed. The invention deals with the problem that the images generated by an input device with a capturable color gamut have to be matched to the color gamut displayable by the image display system on the output side. For this purpose, the patent describes the idea to transform the process-specific color data into a process-independent color space, and to transform them then in turn into other process-specific color spaces.

What remains disadvantageous in the therein-disclosed invention is, however, that for transforming the color data of a device-specific color gamut into a process-independent color space, deviations from the intended color must be tolerated. Thus it is impossible according to this method to transmit an actual color impression via the input device all the way to the output application in a loss-free manner.

In the prior art, another method is disclosed in the patent document WO 2015153764 under the title: Systems and Methods for Color Management, dating to 2014, which attempts to circumvent the disadvantages of the deviations caused by transformation of the device-specific and device-independent color gamuts by using fixed color data for actual colorant recipes for the conversions for transforming the color gamuts. Here, the disadvantage is that the method is limited to an application in which those specific colorant recipes are used. The disclosed invention is limited to specific textile dying materials and techniques. It is difficult to transfer it to other dying techniques, for a color impression generated by a dying material on a specific textile material differs depending on the type of textile material and additional categories.

According to the prior art described above, it is disadvantageous that the color information is always based on a compressed color system, such as LAB, RGB or similar color spaces. While the RGB color space is preferably used in input devices and output devices in a device-dependent manner, a LAB color space describes the color perception from the point of view of an average viewer under a light source to be defined in advance. In both color spaces, it is not possible to display all colors so that they match.

According to prior art, a color can only be described unambiguously by means of spectral measurement. The information from such an unambiguous description is, however, not used for sharing and using color information by means of color and image files. As the usual default, data formats with smaller information volumes are used that allow using the color data in a plurality of output devices and other applications. In addition to the file size, it is primarily the lack of an interpreter that is an additional reason for not using spectral data records for defining the color information for the output application.

Instead, color information is transformed into interpretable standards, even though in this process, system-caused deviations and color gamut losses occur. For generating color and image files, physically measured color values are assigned to a compatible color space that does not correspond to an unambiguous description by means of spectral measurement. Thus, technology-caused deviations can, during the recording process already, change the color assignment, and manufacturers perform device calibration that distorts an unambiguous description. Deviations also occur in output media, for in the display of an unambiguous description of the measured color, device technology conditions are already a cause for deviations.

It is true that recording and output media can be adapted to standard devices by means of calibration in order to achieve the most uniform and matching color reproduction possible in different output media. Calibration can, however, only be used to determine and document the deviation from the standard. The standard is determined by the display of specific color values according to a standardized color space system on another device and is not an unambiguous description of the color impression as after a spectral measurement.

Known and wide-spread according to prior art is the use of so-called ICC profiles (International Color Consortium; synonymous term: color profiles). This is a standardized data record describing the color space of a color input or color output device, e.g., monitor, printer, scanner, etc. ICC refers to an association of many manufacturers of graphics, image processing and layout software programs. The ICC was founded in 1993 with the intent of achieving standardization of color management systems. This is to allow displaying a template captured at any input device as similar as possible in an output device. Ultimately, the color management system is meant to match devices such as scanners, digital cameras, monitors, printers, as well as film and plate setters with each other, and to display the colors according to the conditions.

Here, the disadvantage is that, due to the color files with a smaller color gamut that are used, matching interoperability between different color profiles is not possible, in particular with color profiles containing all of the color data. Colors that cannot be displayed on a device are replaced by values pre-saved in the ICC profile. Vice versa, a replaced color specification cannot be traced back to the unambiguous description.

Disadvantageously, in color management according to prior art, no output medium is able to guarantee matching colors without controlling a sample by comparing the colors to the template. Thus, e.g., color samples are requested and compared during the development and design process in order to be able to transmit the color impression from the design to the product to be produced. This design process is time-consuming insofar as the color impressions of a product developed using a CAD process cannot be matched using exclusively digital means.

Consequently, there continues to be a need for a method to prevent disadvantageous color deviations all the way to the output application.

Thus, the problem to be solved by the present invention consists of providing a method that allows controlled, lossless and color-correct display of color impressions in any output applications.

According to the invention, this problem is solved by a method that uses and provides the data of an unambiguous description of the colors according to claim 1, in order to thus use the data for unambiguously describing the colors for a transformation into a definable LAB color space in real time, as well as the data's use for converting into a different application-specific color space; if necessary, while using the ICC profiles for specific output devices.

Due to the use of spectral data that allow unambiguous description of the colors, different LAB color spaces can be requested for converting a device-independent color gamut, and for the transformation into device-specific color gamuts, also be generated and transmitted in optimum quality while taking into account the ICC profiles. Color deviations due to the use and saving of a color file based on a color space such as LAB or RGB are thus avoided. For this method, a cloud technology is used in order to be able to provide the extremely copious information of an unambiguous color description such as it is available, in particular, after spectral measurement, everywhere. By using and providing a color file with an unambiguous description of the colors, changes of the standards for the intended color spaces can always be taken into account without transformation from the color space with the unchanged standard. It is further advantageous that by means of this invention, a separate, independent method is provided that is not limited to a imaging or printing technology application, but that instead saves the purely physical color impression and makes it portable, and can in addition also be used to save and archive it.

In one embodiment, the invention comprises a computer-implemented method for generating current device-specific color specifications. Here, depending on the output application, device-specific ICC profiles can be used for specific output devices and saved color files can be used for a design process. In a first step of the method, the color data is captured as a spectral data record and addressed for use in the method according to the invention. Such a spectral data record can be generated by measurement. It is, however, also possible to modify the spectral data record. Then the implementation also comprises spectral data records that are generated or modified by digital design.

In a second step of the method, the color data thus generated is then saved in and provided from a storage space in an IT infrastructure via a computer network, preferably a cloud application.

In a third step of the method, an external data query for an output application is checked and processed via the IT infrastructure based on the specifications of the querying party.

The fourth step of the method provides for converting the saved color data into a lab value that is advantageous for the queried application or into a specific lab value from the corresponding LAB color space. In a so-called LAB color space these are color descriptions determined by querying the viewers, which will be differentiated both in terms of the amount of light as well as the viewer. The color model is standardized as the standard CIE LAB color space according to DIN EN ISO 11664-4 "Colorimetry—Part 4: CIE 1976 L*a*b*Colour space." The standard CIE LAB color space is, however, also subject to changes. For example, a better color difference formula was developed for the CIE value, in order to allow taking color differences due to the color location and the viewing conditions better into account.

In a sixth step of the method, any present ICC profiles are queried for the output application intended by the querying party, and used for the subsequent step of the method.

The LAB values generated in the fifth step of the method can then, in a sixth step, be transformed into a device specific color space specific to the query using an ICC profile, taking into account the specific output devices. Thus, during transformation, the color information from the unambiguous description from the spectral data record will be converted in real time via the LAB values into the color space of the intended output device. In an eighth step of the method, the transformed color space is transmitted as a data record for an application. Calculating the color data in real time can guarantee that an element (color) to be displayed is always displayed in optimum quality with regard to the technical possibilities of the output device. Both the RGB color space as well as the Lab color space are represented as mathematical bodies. Thus, due to their size ratio, reliable transformation into a LAB color profile or another RGB profile is not possible by converting a description of the colors based on an RGB color profile. The same applies to the transformation of an RGB color profile into the RGB color profile of a different output device. For output devices, different ICC standards are used, so that during transformation from one into another RGB color profile, unambiguous color information is lost. Central storage and provision of the color data based on spectral measurement as a spectral data record in an external environment such as in a cloud is advantageous, for such color files are extremely large. In a preferred application, they possess 31 channels. Sharing the spectral data records would be accordingly slowed down. In addition, for using the spectral data records, there are no interpreters for using them in an output device.

Additional features and advantages of the present invention result from the drawing below and the exemplary embodiment, based on which, without limiting the invention on these, the invention shall be exemplarily explained in more detail.

FIG. 1 shows a flowchart and clarifies the hierarchies when transforming the image data from an unambiguous image description into image data with a LAB color space, which can be provided in a device-specific manner to various ICC profiles for concrete output media. In this manner, transformation of the image data is always performed from the data record with the larger color space profile.

The color value saved as a spectral data record with the unambiguous and thus greatest color display options is, e.g., generated by a spectral measurement or by a structure in a digital design and saved in a manner queryable for the output application. Thus the user has the guarantee in the design process that regardless of the output application, the color impression specified by the design will be displayed in the output. For this purpose, when a transformed color data record for a specific output application is queried, the saved spectral data record is converted via a LAB data record into a device-specific value in order to repeat the color impression for the specific output application. For another output application, a LAB data record can again the generated based on the saved spectral data record. The LAB value can be queried as application-specific, and can thus be different.

The invention claimed is:

1. A computer-aided method for matching color display for different output applications, comprising the following instructions:
   a) an instruction for identifying specific color data as a spectral data record;
   b) instructions for storing the identified color data in a storage location in an IT infrastructure;
   c) an instruction for identifying a data query for an output application via the IT infrastructure;
   d) instructions for converting the color data into a value from the LAB color space that is advantageous for the queried application;
   e) an instruction for querying the device-specific color profile, in particular, the ICC profile for the specific output device;
   f) an instruction for converting the generated Lab data into the device-specific color gamut of the output device intended for the query;
   g) an instruction for transmitting the device-specific color data transformed from the generated Lab data to an output device intended for the query.

2. The method according to claim 1, characterized in that the color data to be identified in section a) of the method is approximatively calculated based on substance or material specifications.

3. The method according to claim 1, characterized in that for section a) of the method, the color data to be identified is provided for use from the color data already saved.

4. The method according to claim 1, characterized in that for the sections of the method, the color data in a cloud application is used.

5. The method according to claim 1, characterized in that the conversion of the Lab data to be performed in section f) of the method is performed into the device-specific color profile of a different infrastructure.

* * * * *